United States Patent Office 3,499,845
Patented Mar. 10, 1970

3,499,845
PREPARATION OF DEHYDROGENATION CATALYST
Reno W. Moehl, Evanston, Ill., assignor to Universal Oil Products Company, Des Plaines, Ill., a corporation of Delaware
No Drawing. Filed Aug. 28, 1967, Ser. No. 663,564
Int. Cl. B01j 11/06, 11/40; C07b 3/00
U.S. Cl. 252—442
7 Claims

ABSTRACT OF THE DISCLOSURE

A catalyst preparation useful in the dehydrogenation of hydrocarbons. An alumina hydrogel is precipitated from an aqueous aluminum chloride solution. The hydrogel is filtered and the chloride level of the wet filter cake adjusted to a predetermined level. The wet filter cake is then slurried with an impregnating solution of a compound of chromium and an alkali metal and then dried and calcined. The catalyst is of improved strength, selectivity, activity and stability.

BACKGROUND OF THE INVENTION

The present invention is particularly useful with respect to the dehydrogenation of ethane, propane, n-butane, isobutane, n-pentane, isopentane and the like. This invention is also applied advantageously in a process for the dehydrogenation of various other paraffinic hydrocarbons containing six or more carbon atoms per molecule. The products of the dehydrogenation reaction herein contemplated find extensive use in a variety of industries including the petroleum, petrochemical, pharmaceutical and plastics industries. For example, propylene is utilized in the manufacture of isopropyl alcohol, cumene, polypropylene, propylene dimer, trimer, and tetramer, and in the synthesis of isoprene. Butylenes, including butene-1, and cis- and trans-butene-2, are extensively employed in polymer and alkylate gasolines, in the manufacture of polybutenes, butadiene, aldehydes, and alcohols, as crosslinking agents for polymers, and in the synthesis of various $C_4$ and $C_5$ derivatives. Isobutene finds use in the production of isooctane, butyl rubber, acrylonitrile, etc., while pentenes are primarily employed in organic synthesis, although 1-pentene is often used as a blending agent for high octane motor fuel.

Dehydrogenation as herein contemplated can be effected thermally at temperatures which avoid pyrolysis. However, the reaction proceeds so slowly that long periods are required to reach equilibrium and the olefin product yield is commercially insignificant. Of the numerous catalysts that have been proposed to catalyze the dehydrogenation reaction, those comprising chromia and alumina, and generally including an alkali metal promoter, are among the more prominent and the state of the art is well developed with respect thereto. However, as those familiar with the art of catalysis will appreciate, even minor variations in composition or technique of preparation often contribute a significant and unanticipated improvement in the selectivity, activity, and/or stability of a catalyst with respect to a particular reaction. It is an object of this invention to present an improved chromia-alumina catalyst for the dehydrogenation of paraffinic hydrocarbons. It is a further object to present a novel method of preparing said catalyst.

SUMMARY OF THE INVENTION

In one of its broad aspects, the present invention embodies a method of preparing a dehydrogenation catalyst which comprises precipitating an alumina hydrogel from an aqueous aluminum chloride solution at a pH of from about 8.0 to about 8.5, filtering and water-washing said hydrogel until the wet filter cake comprises from about 0.5% to about 2% chloride based on the solids content thereof, preparing a slurry of said hydrogel in an aqueous impregnating solution comprising an alkali metal salt and a soluble compound of chromium, thereafter drying the resulting mixture and calcining the dried material.

In accordance with the method of this invention, an alumina hydrogel is first precipitated from an aqueous aluminum chloride solution at a pH of from about 8.0 to about 8.5. It is contemplated that other aluminum halides, e.g., aluminum bromide, aluminum fluoride, aluminum iodide, and the like, may be employed. However, in view of the fact that aluminum chloride is available in commercial quantities and is generally utilized in preference to the other aluminum halides, the further description of the method of this invention will be restricted thereto.

The alumina hydrogel is suitably precipitated from the aqueous aluminum chloride solution by the accepted method of commingling an alkaline reagent, such as ammonium hydroxide, ammonium carbonate, etc., with the acidic aluminum chloride solution to attain an alkaline pH, in this case a pH of from about 8.0 to about 8.5. A pH in the aforesaid range is necessitated to insure substantially complete precipitation of the alumina hydrogel and to obtain a final catalyst product of improved attrition resistance. The flocculent precipitate which forms is separated from the supernatant liquid, usually by filtration means.

At this stage of the preparation, prior to drying and calcination, the wet alumina hydrogel, with the chloride level adjusted to the aforesaid level, is slurried with an aqueous impregnating solution comprising an alkali metal salt and a soluble compound of chromium. The alkali metal salt concentration in said solution is such as to insure a final catalyst composite comprising from about 0.2% to about 5% alkali metal calculated as the oxide thereof. The alkali metal is preferably potassium and suitable potassium salts include potassium nitrate, potassium sulfate, potassium carbonate, etc. Sodium, lithium, rubidium, and/or cesium have also been shown to be suitable promoters and can be employed in the impregnating solution in the form of their soluble salts together with or in the place of the preferred potassium.

The soluble chromium compound employed is suitably chromic acid or chromium trioxide. The concentration of said compound in the impregnating solution should be sufficient to insure a final catalyst composite comprising from about 1.0% to about 50% chromium calculated as the oxide $Cr_2O_3$.

It has been observed that by adjusting the pH of the slurry to a pH of from about 4.7 to about 5.2, prior to drying and subsequent calcination, a further improvement in the catalyst product is attained. In particular, the catalyst product will effect a substantially higher conversion of the saturated hydrocarbon starting material in the dehydrogenation reaction herein contemplated.

The slurry comprising the described alumina hydrogel and impregnating solution is mixed or slurried to establish a substantially uniform mixture and thereafter treated at conditions to evaporate the impregnating solution to dryness. A preferred method comprises spray-drying whereby the slurry, mixed to a smooth consistency, is sprayed in an atomized state into an atmosphere of hot inert gases to effect a rapid evaporation of moisture so that dried particles in a predetermined size range fall out of the spray. An alternative method comprises evaporating the slurry to dryness in a rotary steam drier.

Regardless of the method of drying, the dried material is subjected to calcination at a temperature of from about 500° C. to about 1000° C. A particularly preferred calcination temperature is from about 650° C. to about 800° C. The calcination may be effected in any suitable atmosphere. Usually the calcination is effected in the presence of air or other oxidizing media although in some cases it may be effected in a reducing atmosphere such as hydrogen, or an inert atmosphere such as nitrogen. The time of calcination will vary with the temperature but generally need not exceed about 10 hours. The following examples are presented in illustration of the method of this invention and are not intended as an undue limitation on the generally broad scope of the invention as set out in the appended claims.

EXAMPLE I 6530 grams of an alumina hydrogel comprising, 0.13% Cl and 88% volatile matter at 900° C., was impregnated with 383 grams of chromium trioxide, $CrO_3$, and 15.7 grams of potassium nitrate, $KNO_3$, dissolved in 1200 ml. of water. The pH at this point was 3.7. The slurry was dried at 250° C. with frequent stirring. The dried material was calcined at 650° C. and then ground through 12 mesh screen onto a 30 mesh screen. The catalyst thus prepared analyzed 40% $Cr_2O_3$ and 2% $K_2O$. About 20 cc. of the granular catalyst was placed in a fixed bed of a vertical quartz reactor maintained at a temperature of 650–700° C. and at a pressure of 3–4 p.s.i. The catalyst was evaluated by passing propane downflow through the reactor for a period of 12 seconds at a rate of 6.0 s.c.f./hr. (standard cubic feet per hour). The propane was followed by a nitrogen stripping gas for 10 seconds at 3.4 s.c.f./hr., an air regenerating gas for 300 seconds at 2.0 s.c.f./hr., a nitrogen purge gas for 10 seconds at 3.4 s.c.f./hr., and a hydrogen reducing gas for 30 seconds at 6.0 s.c.f./hr. The cycle was continuously repeated by means of a cyclic timer to establish an extended evaluation period. The reactor effluent was split into appropriate streams by means of a solenoid controlled valve synchronized with the charge system. The reactor effluent was analyzed periodically to determine propane conversion.

| On stream, hrs | 2 | 4 | 18 |
|---|---|---|---|
| Conversion, percent | 42.3 | 42.2 | 42.3 |
| Selectivity, percent | 95.5 | 93.5 | 93.0 |

EXAMPLE II

A second catalyst was prepared in substantially the same manner as in the previous example with the exception that the pH of the slurry formed by the alumina hydrogel and the impregnating solution was adjusted to 4.9 by the addition of ammonium hydroxide thereto prior to the drying step. The catalyst was evaluated in the described manner and the following results obtained.

| On stream, hrs | 2 | 4 | 18 | 24 |
|---|---|---|---|---|
| Conversion, percent | 53.4 | 52.8 | 49.7 | 49.0 |
| Selectivity, percent | 89.2 | 90.7 | 91.3 | 91.8 |

I claim as my invention:

1. A method of preparing a dehydrogenation catalyst which comprises precipitating an alumina hydrogel from an aqueous aluminum chloride solution at a pH of from about 8.0 to about 8.5, filtering and water-washing said hydrogel until the wet filter cake comprises from about 0.5% to about 2.0% chloride based on the solids content thereof, preparing a slurry of said hydrogel in an aqueous impregnating solution comprising an alkali metal salt and a soluble compound of chromium, thereafter drying the resulting mixture and calcining the dried material.

2. The method of claim 1 further characterized in that said slurry is adjusted to a pH of from about 4.7 to about 5.2 prior to drying and calcination.

3. The method of claim 2 further characterized in that the chromium compound concentration and the alkali metal salt concentration of said impregnating solution are sufficient to form a final catalyst composite comprising from about 1.0% to about 50% chromia and from about 0.2% to about 5% alkali metal calculated as the oxide thereof.

4. The method of claim 3 further characterized in that said chromium compound is $CrO_3$ and said alkali metal salt is a salt of potassium.

5. The method of claim 4 further characterized in that said hydrogel is filtered and water-washed until the wet filter cake comprises from about 0.8% to about 1.7% chloride based on the solids content thereof.

6. The method of claim 5 further characterized in that said slurry is dried and thereafter calcined at a temperature of from about 650° C. to about 800° C.

7. The method of claim 6 further characterized in that said slurry is spray-dried and thereafter calcined at said temperature.

References Cited

UNITED STATES PATENTS

| 2,943,067 | 6/1960 | Sieg | 252—465 |
| 2,991,255 | 7/1961 | Malley et al. | 252—465 X |
| 3,058,907 | 10/1962 | Van Nordstrand et al. | 252—442 X |
| 3,188,174 | 6/1965 | Kehl et al. | 252—465 X |
| 3,189,661 | 6/1965 | Mulaskey et al. | 252—465 X |

DANIEL E. WYMAN, Primary Examiner

C. F. DEES, Assistant Examiner

U.S. Cl. X.R.

252—465, 476